Feb. 7, 1939.　　　F. M. THOMPSON　　　2,146,456
TURN-OVER APPARATUS FOR HALVED FRUIT
Filed Oct. 10, 1936　　　2 Sheets-Sheet 1
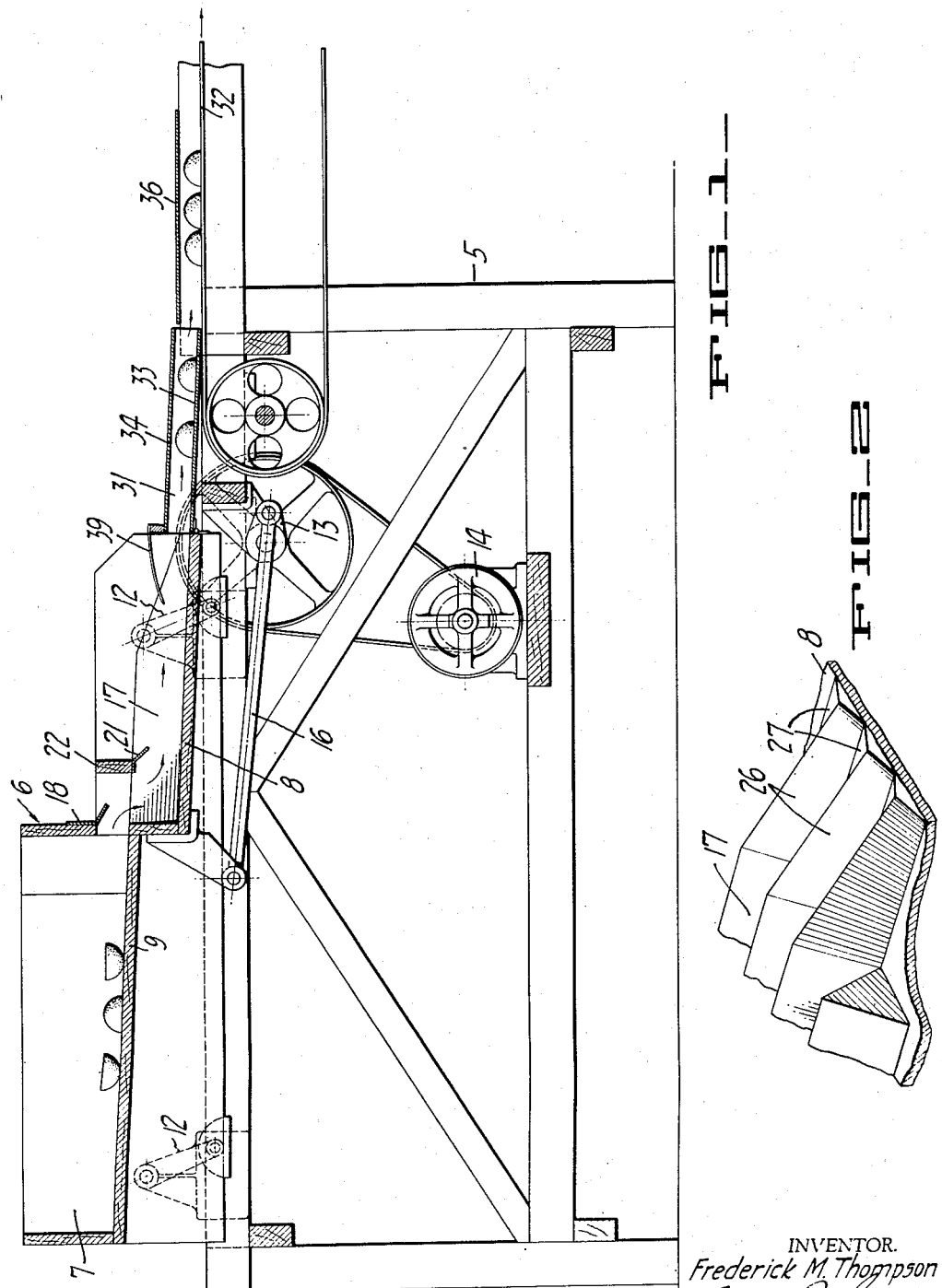
INVENTOR.
Frederick M. Thompson
BY
ATTORNEY.

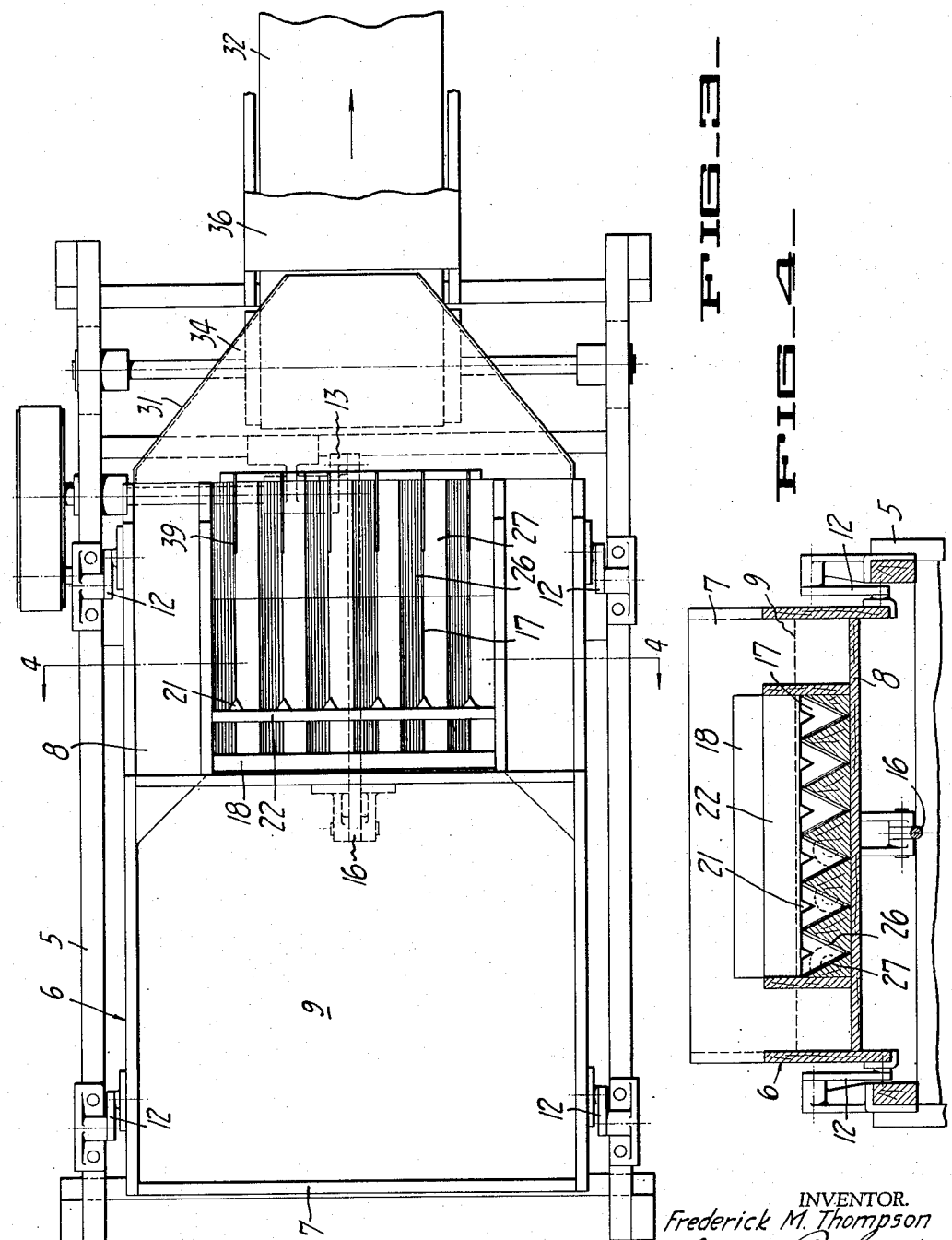

Patented Feb. 7, 1939

2,146,456

UNITED STATES PATENT OFFICE 2,146,456

TURN-OVER APPARATUS FOR HALVED FRUIT

Frederick M. Thompson, Oakland, Calif.

Application October 10, 1936, Serial No. 105,030

4 Claims. (Cl. 198—33)

The invention relates to an apparatus for effecting delivery of halved fruit to a slicer or the like, with the halves presented cut face downward, and more particularly the invention relates to the type of such apparatus in which the desired positioning or presentation of the fruit is brought about by causing the fruit to be turned over or reversed while in course of movement to the slicer.

An object of the invention is to provide an apparatus of the character described which will permit of the fruit being moved through the apparatus at a relatively high rate of speed and in closely associated relation without danger of the halves failing to turn over to correct position or subsequently reverting to incorrect position.

Another object of the invention is to provide an apparatus of the character described in which the several parts thereof effecting successive but distinctive operations in the turning and delivery of the fruit, are so designed and related as to afford a uniform movement of the fruit throughout its course of travel through the machine without bringing about a crowding action at some points and the opposite action at other points.

A further object of the invention is to provide such an apparatus which will operate effectively with, and have means thereon which will insure an even distribution of the fruit through the apparatus.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a vertical longitudinal sectional view of one form of the apparatus of my invention.

Figure 2 is a fragmentary perspective view of the delivery end of the turn-over means of the apparatus.

Figure 3 is a plan view of the apparatus.

Figure 4 is a transverse sectional view of the apparatus taken on the line 4—4 of Figure 3.

The apparatus of the present form of the invention is designed particularly for use with fruit such as peaches, apricots, etc., which have been cut into halves, and the function of the apparatus is to supply the halved fruit directly to a device which is arranged to cut or slice the halves into small segments while the halves are supported on their cut or flat faces. It may be readily perceived that when a quantity of the halved fruit is dumped into the apparatus for delivery to the slicer, a large portion of the halves will be deposited on their backs and especially so where one piece of fruit partially overlies another. To present the fruit to the slicer with some of the halves overlying the others or disposed in some position other than on their severed faces, would result in improper slicing and mutilation of the fruit. It is therefore of utmost importance that each and every half of fruit be properly turned and positioned on its flat face by the time the fruit reaches the slicer, and it is to the effective accomplishment of such purpose, that my invention is primarily directed.

As illustrated in the drawings, the apparatus comprises a frame 5 providing a support for a shaker unit 6 which includes a receiving hopper 7 and a platform 8 onto which the fruit from the hopper is transferred and upon which the halves are turned so as to leave the platform with the severed faces of the fruit at the bottom. The platform and the bottom wall 9 of the hopper are approximately horizontally disposed but preferably slope gently downward in the direction of the delivery end of the apparatus. Desirably the effective level of the platform is somewhat below the bottom 9 of the hopper so as to facilitate the ready distribution of the fruit on the platform when the same is discharged thereon from the hopper. As will be understood the hopper and platform are fixed together so that each will move in unison with the other and consequently the deposit of the fruit from the hopper upon the platform will be definite and certain notwithstanding the use of the oscillating action of the hopper for effecting the discharge of the fruit from the hopper to the platform. The unit 6 is supported for oscillation on the frame 5 by means of hanger links 12, and the desired oscillation is effected by means including a crank 13 which is driven by a motor 14 and connected to the unit by a connecting rod 16. As will be understood, due to the slope and character of the movement to which the shaker unit is subjected by the means aforesaid, the fruit on the unit will be advanced thereon toward the delivering end of the apparatus.

The turning platform 8 of the shaker unit has provided on its upper face a plurality of longitudinally extending and parallel related grooves or channels 17 whose side walls are obliquely disposed so as to constitute channels V-shape in cross section with the open side at the top. Desirably the channels extend from a point immediately adjacent the discharge end of the hopper, and as will be clear from Figure 4, the adjacent sides of the adjoining channels meet at the top edge so that when the fruit halves from the hopper are initially deposited upon the turning platform they will necessarily enter one or another of the channels. In order that but one piece of fruit will enter each channel at a time, there is provided at the discharge end of the hopper, a gate 18 which extends across such end and is vertically adjustable so that in accordance with the size of fruit being handled, a discharge orifice may be defined whose vertical dimension is such as to accommodate but a single half of fruit.

The depth of the channels is preferably that at least equal to the diameter of the average sized fruit which the apparatus is designed to handle, and the angular relation between the opposing side walls of each channel, is such that when a half of fruit is disposed within the channel with an edge at the apex thereof, the curved back of the fruit will engage with one wall, while the severed face will be held flat against the opposing wall. At the same time the angle between the walls should be such that the center of gravity of the fruit will be located over the side wall of the channel engaged by the severed face of the fruit, and further such angle should not be so acute as to cause the fruit while in said position to become so firmly wedged between the walls as to prevent the fruit from sliding freely along and through the channel under the influence of the vibratory action of the unit. It will be understood that when the fruit from the hopper drops into the channels, the halves will assume the upended position aforesaid, if not directly then soon after being subjected to the shaker action. Should the fruit in any of the channels fail to properly fit down in the channels after partially advancing therethrough, the fruit so improperly disposed will strike against deflector fingers 21 which are fixed to a cross member 22 and designed to extend partially into the channels at the top thereof. The fingers 21 also perform the function of dislodging any fruit that may be advancing through the channel while riding upon some of the fruit properly seated in the channel. Desirably the cross member 22 is positioned close to and directly opposite the discharge orifice of the hopper so that any fruit ejected too forcibly from the hopper, will strike the member and be prevented thereby from hurdling the lower layer of fruit advancing through the channels. Since the center of gravity of each piece of fruit will lie over the side of the channel engaged by the severed face, the weight of the fruit will serve to keep said face in contact with such side throughout the course of the fruit through the channel and any variation in the angular relation of said wall, such as an approach to the horizontal, will cause the fruit to vary its angular position accordingly. In keeping with the foregoing, the opposing walls of each of the channels are formed so that the portions 26 and 27 thereof near the discharge end of the channels are widened out and reduced in pitch so that the vertical component of the walls become gradually lessened until at the very end of the channel the side portions are at a relatively small angle to the horizontal and the fruit halves pass from the discharge end of the channels in substantially horizontal position with their severed sides down. In this way after the fruit has been properly initially positioned in the channel, that is with the severed face of each piece resting upon a side wall, the fruit will reach one of the wall portions 26 and 27 and, due to the gradual decrease in the inclination of such portion, the fruit as it advances thereover will in effect be turned from a substantially upright to a horizontal position with the severed side facing downward. It is important to note that the wall portions 26 and 27, due to their comparative length, avoid subjecting the fruit to any abrupt change in position, and furthermore, since the fruit when advancing over the portions 26 and 27 remain, and in fact become more firmly supported on the flat face as the fruit is turned, there is practically no opportunity afforded for displacement of one piece of fruit by the crowding action of the piece of fruit at the head or at the rear.

Hinged to the shaker unit 6 at the discharge end of the channels, is what may be termed a delivery chute 31 and which in a sense may be considered part of such unit. As will be clear from Figure 1, the free or discharge end of the chute rests upon a conveyor belt 32 upon which the fruit from the chute is deposited and delivered to the slicing mechanism. It is to be noted that side walls of the chute converge toward the free end so that the fruit on the bottom wall 33 of the chute is moved into closer concentration as the fruit is advanced through the chute and upon the belt. As an important part of the invention there is provided a top guard or wall 34 which is arranged over and preferably made part of the chute, and such wall is positioned in such proximity to the bottom wall as to prevent any of the fruit from upsetting and turning over upon its back during its passage from the channels to the belt. Preferably also a top guard 36 is positioned over the belt so as to prevent any upsetting or turning over of the fruit during the passage of the fruit from the chute to the slicer blades. By the use of the guards 34 and 36 or equivalent means, fruit may be caused to advance through the apparatus at a relatively high rate of speed without danger of any of the halves being turned over after they have been properly positioned by the channel wall, and in this way a machine of high capacity is afforded.

If desired, fingers 39 may be fixed to the intake end of the chute 31 and positioned to lie over channels adjacent the discharge end thereof, the fingers serving to assist in guiding the fruit to turn downward in case some of the fruit due to the odd shape thereof or for any other reason is slow in effecting the prompt turning action.

I claim:

1. In a turn-over apparatus for halved fruit or the like, a shaker unit including a distributing section for the fruit having a delivery point, means at said point for limiting the delivery of fruit from said point to a single layer, a fruit advancing and turning section fixed for movement with said first section and comprising opentopped V-shaped channels extending from adjacent said delivery point to a discharge point and defined by side walls progressively decreasing in vertical angularity at the discharge end, and means providing projections extending downward into said V-shaped channels at a plurality of points along said turning section for preventing said fruit from stacking up or turning upright.

2. In an apparatus of the character described, a shaker unit comprising a halved fruit receiving section having an approximately horizontally extending bottom and a delivery point for the fruit, means at said point providing a discharge opening of a height sufficient only to permit passage of one piece of fruit vertically, a second section having a bottom with fruit-receiving channels extending substantially from said opening and arranged with the base of the channels in a plane below the lower extremity of said opening and with the top of the channels substantially no higher than said extremity, and a fruit deflector member extending transversely across said channels and in opposed spaced relation to said opening.

3. In an apparatus of the character described, a shaker unit comprising a halved fruit receiving section having an approximately horizontally extending bottom and a delivery point for the fruit, means at said point providing a discharge opening of a height sufficient only to permit passage of one piece of fruit vertically, a second section having a bottom with fruit-receiving channels extending substantially from said opening and arranged with the base of the channels in a plane below the lower extremity of said opening and with the top of the channels substantially no higher than said extremity, a fruit deflector member extending transversely across said channels and in opposed spaced relation to said opening, and fingers extending downwardly and centrally into said channels intermediate said deflector member and the discharge end of the channels.

4. In a turn-over apparatus for halved fruit or the like, a shaker unit including a distributing section for receiving said fruit, a point for delivery of fruit from said section including a gate for limiting the delivery of said fruit to a single layer, a fruit advancing and turning section comprising open-topped V-shaped channels extending from adjacent said delivery point to a discharge point and defined by side walls progressively decreasing in vertical angularity at the discharge end to position said fruit with its cut face downward, means for keeping the fruit in said position during passage along said V-shaped channels comprising spaced sets of projections extending into the channels, and a converging closed top chute of depth just sufficient to allow passage of the fruit therethrough when in said position, and a conveyer at the discharge end of said chute for removal of said fruit from said chute.

FREDERICK M. THOMPSON.